Patented Feb. 2, 1954

2,667,742

UNITED STATES PATENT OFFICE 2,667,742

STARTING SYSTEM FOR GAS TURBINE ENGINES

Andrew A. Kuzmitz, South Bend, Ind., assignor to Bendix Aviation Corporation, South Bend, Ind., a corporation of Delaware Application February 24, 1947, Serial No. 730,622

25 Claims. (Cl. 60—39.14)

This invention relates to fuel supply and starting systems for gas turbine engines; it is particularly, but not necessarily, concerned with starting systems for gas turbine engines adapted for powering aircraft, as where the engine functions as a straight jet engine, a gas turbine propeller engine, or combines the functions of a jet engine and a propeller engine.

Among the objects of the invention are:

To obtain pressure at the fuel discharge nozzles during starting sufficient to insure good spray atomization at relatively low cranking speeds;

To provide a fuel feed and coordinated ignition system wherein all or a major portion of the fuel sprayed into the burner system during starting will be ignited so that a minimum of raw fuel will enter the tail cone before combustion takes place in the entire burner system;

To provide a starting system for engines of the above type which will produce ignition at the burners and increase the engine speed or R. P. M. to a self-sustaining value in as short a time as possible without exceeding safe combustion temperatures;

A starting system capable of making safe restarts in flight in the event of flame blowout or dieout with a minimum of attention or manual effort by an operator or pilot;

A starting system which will prevent too rich a fuel flow after ignition is obtained in the entire group of burners, with consequent increase in temperature in the burner system beyond a safe value;

A starting system wherein starting fuel is initially conducted directly to the point of ignition of one or more pilot burners without entering and accumulating in a manifold ring or other fuel receiving device common to all burners;

An ignition system coordinated with a fuel supply system to obtain safe and efficient starting under all conditions of operation; and To generally improve starting systems for gas turbine engines.

The foregoing and other objects and advantages will become apparent in view of the following description taken in conjunction with the drawings, wherein.

The engine shown for the purposes of illustration is of the multiple burner type having an electrical ignition system, but it will be understood that while the invention is primarily adapted for use with such type of engine, it is not necessarily limited thereto. Thus, the teaching of the invention may, in certain respects at least, be equally applicable to gas turbine engines having a single or undivided annular burner chamber, and this may also be true of the ignition system, which could under certain aspects of the invention be other than electric; for example, it could be by means of the so-called starting torch or by a pilot flame.

Figure 1:
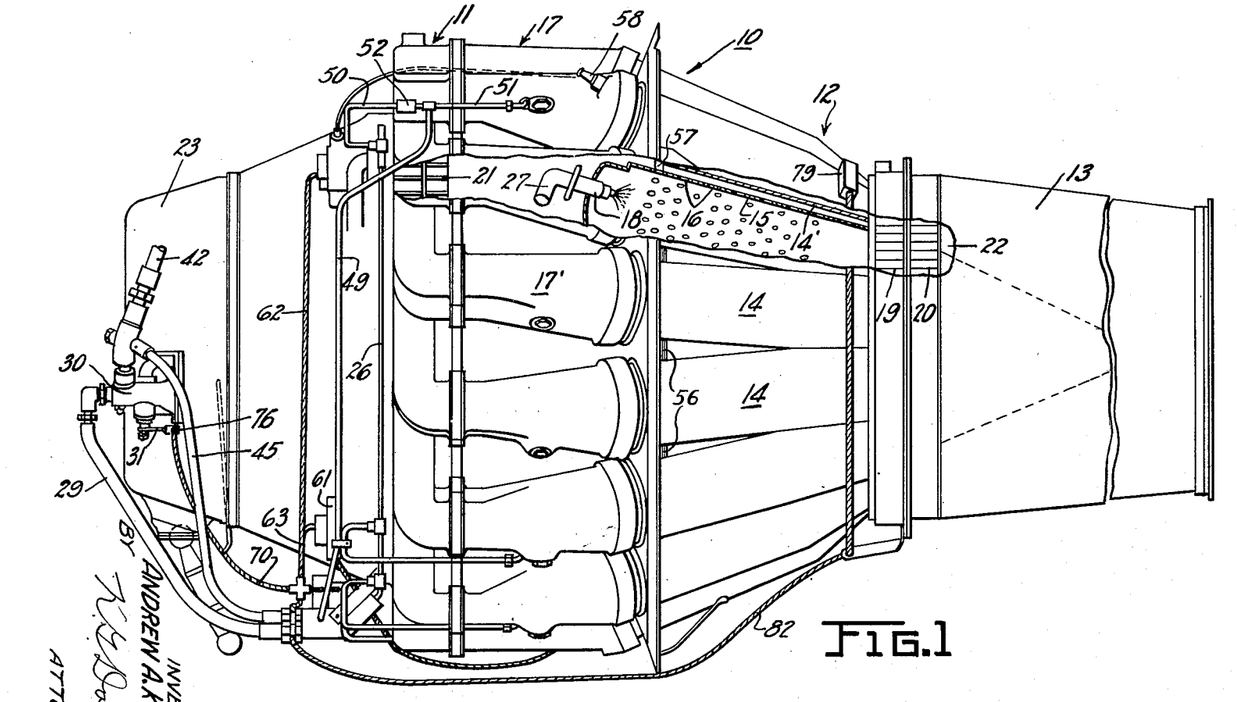
Figure 1 is a view in elevation and partly broken away of a gas turbine engine for aircraft equipped with a starting system in accordance with the invention.

Referring first to Figure 1, a gas turbine power plant in the form of a turbojet propulsion engine is generally indicated at 10; in general, it comprises a compressor rotor assembly 11, a turbine rotor assembly 12 and an exhaust unit or tail cone 13, to which is connected the conventional tail pipe and discharge nozzle or reaction jet assembly, not shown.

The turbine rotor assembly includes a plurality of annularly disposed combustion chambers 14, each comprising an outer tubular shell 14' in which is mounted a flame tube or burner 15, spaced from the outer shell 14' and formed with a series of openings 16 for admitting compressed air into the tube. An air adapter or header section, generally indicated at 17, is detachably connected to the front end of the burner assembly; it comprises a plurality of air adapters 17', one for each combustion chamber, which direct air under pressure to said chambers, where it enters the flame tubes 15 and mixes with the fuel discharged from burner nozzles 18 to effect combustion, the expanded air and products of combustion being discharged from the burner tubes through stator blades forming part of a nozzle diaphragm assembly 19 and then through the blades of a turbine 20 to effect rotation of the latter.

The compressor rotor assembly mounts a dynamic compressor 21, which may be either of the centrifugal type or the axial flow type, driven by the turbine 20 through suitable shafting, not shown, to force air under pressure into the air adapters or headers 17'.

The expanded air and products of combustion, after passing through the blades of the turbine 20, are discharged to the atmosphere through the tail zone and discharge nozzle to effect propulsion of an aircraft in which the engine may be mounted. A diffuser 22 is usually mounted in the tail cone 13. Propulsion may also be effected, in whole or in part, by a propeller, not shown, which would be driven from the turbine 20.

The various accessories which go to make up the complete power plant 10 are mounted at the front of the engine on a suitable streamlined casing 23. Among these accessories is the coordinated fuel feeding and ignition system of the present invention, one form of which is diagrammatically shown in Figure 2.

Figure 2:
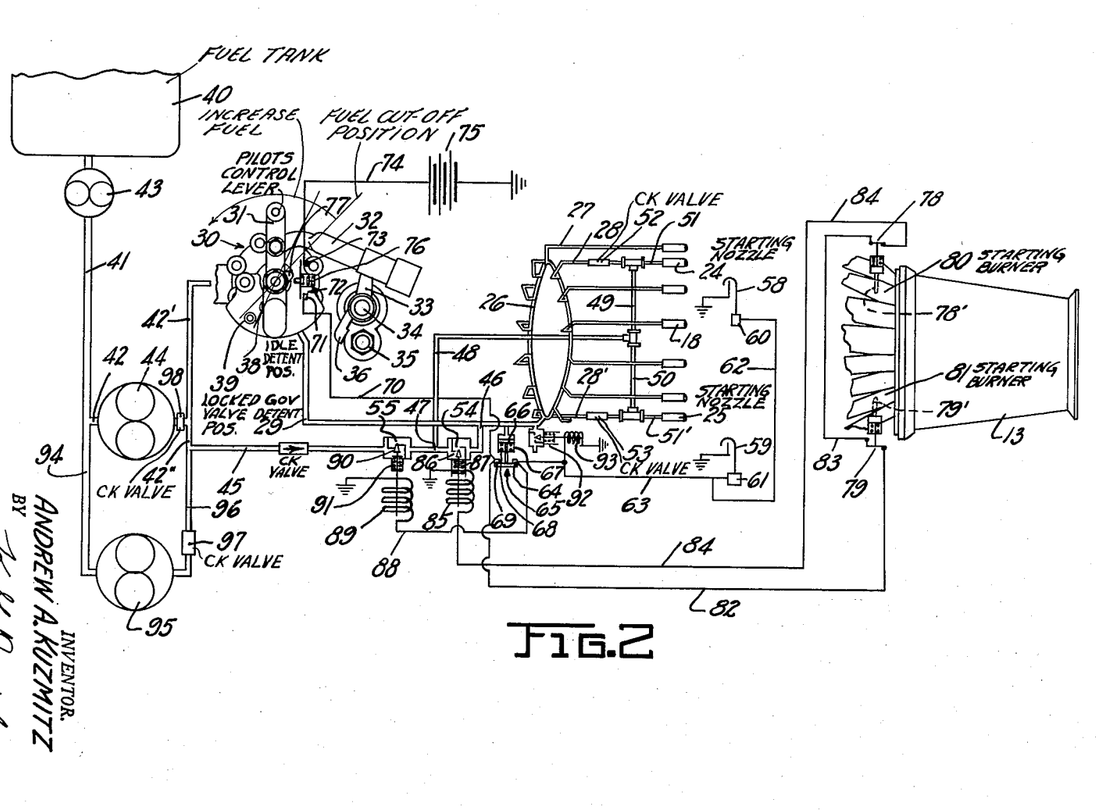
Figure 2, a schematic or diagrammatic view of the starting system of Figure 1.

The fuel system includes the discharge nozzles 18, Figure 1, also 24 and 25, Figure 2, to which fuel is supplied by way of a manifold ring 26 and a series of individual fuel lines 27 and 28, 28'. The nozzles 24 and 25 have been given separate reference numerals since they also function as pilot or starter nozzles in a manner to be described. The manifold ring receives fuel from a main fuel conduit 29, having mounted therein a fuel control unit, generally indicated at 30, and which may be and preferably is substantially similar to that disclosed in the copending application of Frank C. Mock, Serial No. 716,154, filed January 13, 1946. In Figure 2, only the control lever and coacting parts of the unit 30 are shown, since the particular type of control unit is a matter of choice and forms no essential part of the present invention. The parts shown include a control lever 31, having pivotally connected thereto the one end of a hollow link 32, the opposite extremity of said link being pivotally connected to a lever 33 secured on a shaft 34, which when rotated in a counterclockwise direction, compresses a governor spring, not shown, and thereby determines the setting of a fuel feed or governor valve, also not shown, which in turn determines the rate of fuel feed. A maximum speed adjusting eccentric is indicated at 35 and is adapted to be contacted by an extension 36 of the lever 33 when the lever 31 is rotated counterclockwise to high power position. When the lever 31 is rotated in a clockwise direction to a predetermined setting, it engages an idle detent 38 and acts through an engine driven governor, not shown, to position a governor feed valve, also not shown, and maintain the fuel feed at a predetermined idling rate; and if it is rotated further in a clockwise direction, it engages a so-called locked poppet detent 39, at which point the governor feed valve is under direct manual control free of the governor. Further rotation in a clockwise direction brings the said lever 31 to a fully closed fuel cut-off position.

A fuel tank is indicated at 40, and leading from this tank is a fuel conduit 41, having a boost pump 43 therein, which may be of the electric type controllable from a remote point such as the pilot's compartment. The conduit 41 communicates with a conduit 42 having an engine driven pump 44 mounted therein; it has an in-built by-pass, not shown, with a by-pass valve set to maintain the delivery pressure within a predetermined value. The pump 44 delivers into either or both branch conduits 42' and/or 42" through a check valve 98. A starting fuel conduit 45 has its intake end communicating with the conduit 42"; it has two discharge points, one at 46 into the fuel conduit 29 downstream of the control unit 30 and the other at 47 into a manifold by-pass conduit 48, from which fuel may flow to the pilot nozzles 24 and 25 by way of T-connections 49 and 50 and pipes 51, 51'. It will be noted that the fuel supplied to the nozzles 24 and 25 through the conduit 48 by-passes the fuel manifold ring 26, although fuel may also be supplied to said latter nozzles direct from the manifold ring 26 by way of fuel lines 28 and 28' and pipes or fuel line sections 51, 51'. The fuel lines 28, 28' discharge into 51, 51' through check valves 52 and 53, to prevent back or return flow of fuel into the manifold ring when the starting system is functioning.

On the downstream side of the point 47 where the conduit 48 is tapped into the conduit 45 is a valve port 54, controlled in a manner to be described, and on the upstream side of the tap-in point 47 is another valve port 55, also controlled in a manner to be described.

A pair of spark plugs are diagrammatically indicated at 58 and 59 and their coacting spark coils at 60 and 61, the latter usually comprising a primary and secondary together with a make-and-break device functioning to provide a high voltage to the spark plugs from the low voltage battery source. Only one spark plug and coacting starting nozzle need be employed if desired, since once one of the burners is ignited, the flame will spread through so-called outer and inner crossover tubes indicated at 56 and 57 in Figure 1 to the remaining burners, and it will also spread by way of the nozzle diaphragm 19. However, by having two spark plugs and pilot burners equally spaced, or about 180° apart, the time required for the flame to spread to all the burners is naturally reduced.

The spark plugs 58 and 59 are electrically connected in series by a wire 62, which in turn is connected to a wire 63, leading to the one terminal 64 of a pressure switch 65, carried by a piston 66, mounted in a cylinder 67 and normally urged toward closed position by a spring 68, the said cylinder being in fluid pressure communication in a switch opening direction with fuel conduit 29. The opposite terminal 69 of switch 65 is connected by a wire 70 with the one terminal 71 of a main control switch 72, the opposite terminal 73 of said latter switch being connected by a wire 74 with the positive terminal of a battery 75 or other suitable source of supply. The switch 72 is normally urged toward open position by a spring 76, and as herein shown, it is adapted to be closed by a cam 77, rotatable through movement of the lever 31 of the main fuel control unit 30, the contour of the cam being such that it closes switch 72 when the lever 31 is in idle position but allows the spring 76 to hold the switch open at all other positions of the lever. Another convenient way of controlling switch 72 is through the idle detent 38, which may be arranged so that it closes the switch 72 when it is depressed by lever 31.

The switch 65 also constitutes part of a thermal control circuit comprising a pair of normally closed thermal switches 78 and 79, each having a thermal element 78', 79' located at a point where it will respond quickly to changes in temperature in the region of discharge of the starting burners or combustion chambers fired by fuel from the pilot nozzles 24 and 25, said starting burners being indicated in Figure 2 at 80 and 81. These thermal switches 78 and 79 may be of any suitable type wherein when the thermal elements 78', 79' attain a predetermined temperature, for example, 500° F., they expand and actuate the switch members controlled thereby from a normally closed to an open position; they may incorporate thermocouple switch elements capable of withstanding relatively high temperatures. A wire 82 connects at one end with the terminal 69 of pressure switch 65 and at its opposite end with the one terminal of switch 79, the opposite terminal of said latter switch being connected by wire 83 with one terminal of switch 78, while the opposite terminal of switch 78 connects by wire 84 with the solenoid coil 85 of a normally open solenoid valve 86, adapted to control the port 54, the said valve 86 being held in open position by spring 87 as long as said coil remains de-energized.

The terminal 64 of pressure switch 65 connects by wire 88 with the solenoid coil 89 of a normally closed solenoid valve 90, the latter being held in closed position by a spring 91 as long as the coil 89 remains de-energized.

The valve indicated at 92 is a drip valve; as here shown, it is of the normally open electric type. Drip valves are usually connected at the low point of the fuel manifold ring and provide a drain for fuel which would otherwise remain in the manifold after the engine is stopped and fuel flow is cut off. In the present instance, the valve 92 is spring-urged toward open position and is closed during starting through energization of the solenoid 93 by way of the pressure switch 65; its construction is such that it is thereafter held closed while the engine is in operation, even though its solenoid coil is de-energized, due to pressure build-up in the fuel system and remains closed until the engine is shut down, whereupon fuel pressure is relieved and it is automatically opened by spring force.

As a safety precaution, the engine driven pump 44 may be by-passed by a conduit 94, pump 95 and conduit 96 provided with a check valve 97, the pump 95 usually being controlled from the pilot's compartment. Another check valve 98 should then be installed in the outlet of the pump 44.

*Operation (Figures 1 and 2)*

In starting the engine, assuming the latter is being used in an airplane or aircraft, the pilot turns on the boost pump 43 and engages the starting motor (not shown). In Figure 2, the switch 72 is open and hence the starting circuit is de-energized, the fuel control lever 31 being shown in running position. When the cranking speed approximates say 1000 R. P. M., the fuel control lever 31 is turned from cut-off to idle position, whereupon cam 77 closes switch 72, and since the pressure switch 65 and thermal switches 78 and 79 are closed, the ignition and starting circuit will be energized, valve 86 will be closed, valve 90 opened and the drip valve 92 closed. As the cranking speed of the engine increases, the boost pump 43 and engine driven pump 44 build up fuel pressure in the conduit 45. As long as the conduit 45 is open and free to by-pass fuel around the control unit 30, there will not be enough pressure built up in the control unit by way of conduit 42' to pass anything but a negligible quantity of fuel therethrough to the conduit 29 at the idle position of the control lever 31. Since the thermal switches 78 and 79 are at this time closed, current will flow by way of circuit wires 70, 82, 83 and 84 to the solenoid 85 and close the valve 86, and current will also flow from wire 70 across the switch 65 and through wires 63 and 62 to the spark coils 61 and 60 and produce sparking at the spark plugs 58 and 59, and by way of wire 88 to the solenoid 89 and hold the valve 90 open. Fuel may now pass by way of conduit 45 to conduit 48 and thence through T-connections 49 and 50 and fuel pipes 51 and 51' to the starter nozzles 24 and 25. However, since the valve 86 is closed, fuel cannot pass to the manifold ring 26, and hence only the nozzles 24 and 25 will discharge fuel, nor will there be any fuel build-up in the manifold and fuel lines to the nozzles 18, the check valves 52 and 53 preventing backflow to the manifold ring from nozzles 24 and 25.

When burning is established in the starting combustion chambers 80 and 81 and the temperature in the area of the discharge of these burners is raised to, for example 500° F., the thermal switches 78 and 79 open, thereby de-energizing the solenoid 85 and valve 86 opens. Fuel in the conduit 29 now acts on the pressure switch 65 and opens the latter, de-energizing the ignition circuit and solenoid 89 and permitting the valve 90 to close, thereby closing off conduit 45. The full boost pump and engine driven pump pressure is now forcing fuel into the control unit 30, and the full idling flow passes into conduit 29 and into the manifold ring 26 and by way of the fuel lines 27 to the nozzles 18. At the same time the pressure in the fuel lines 51, 51', 49, 50 and 48, which supply the starting nozzles 24 and 25, drops to a safe value and these nozles then receive their fuel from the manifold ring and through the lines 28 and 28'. There is now a full supply of idling fuel to all burner nozzles and the flame quickly spreads to all the combusion chambers, whereupon the engine increases in speed until it attains a value initially set for maximum idling, which may be, for example, 4000 R. P. M. During this increase to maximum idling speed, the engine will attain a self-sustaining condition, for example, at 2000 R. P. M. and the starter may then be released.

*Restart in flight*

Flame dieout during flight may take place when the engine has been throttled back to idling speed, while flame blowout may occur when the engine is being accelerated. When flame dieout or blowout occurs, a definite change in thrust, R. P. M. and temperature shortly becomes apparent, or may be signaled to the pilot by some indicating device. However, even during this short period there is a strong possibility of the manifold pressure increasing to a value such as to render ignition hazardous, and therefore it becomes desirable to throttle back from idling speed to fuel cut-off position to exhaust the excess fuel from the tail cone before advancing the throttle for reigniting the burners.

With the system herein disclosed, the ignition circuit need not be cut in until the manifold pressure drops to a value of say 45 to 50 p. s. i., or to a pressure which will permit the spring 68 to close the switch 65, thereby eliminating the possibility of having ignition take place when the manifold pressure is excessive.

One method of restarting in flight is for the pilot to first place the control lever 31 in fuel cut-off position for a few seconds until the engine exhausts the majority of any excess fuel that may have accumulated in the tail section. When the manifold pressure is indicated as being below, say for example 40 p. s. i., the control lever 31 is moved to idle position at which position cam 77 closes switch 72. It is assumed that the engine speed has not in the meantime dropped below a self-sustaining value, usually about 2000 R. P. M.; if so, the starter must be engaged. Since the switch 65 is at this time closed, the conduit 45 will be opened for passage of fuel around the fuel control unit, and ignition will take place at nozzles 24 and 25 in the manner heretofore described. When the temperature in the tail pipe attains a value such as will cause the thermal switches 78 and 79 to open, the valve 86 opens, whereupon the feed of fuel is through both conduits 29 and 45, until the pressure in 29 attains a preselected value and switch 65 opens and valve 90 closes, after which fuel feed is through the control unit 30 by way of the conduit 29 to the manifold ring 26 and thence to all the burner nozzles. Opening of switch 65 also cuts off the ignition circuit. The control lever 31 can then be advanced to accelerate as desired.

Figure 3:
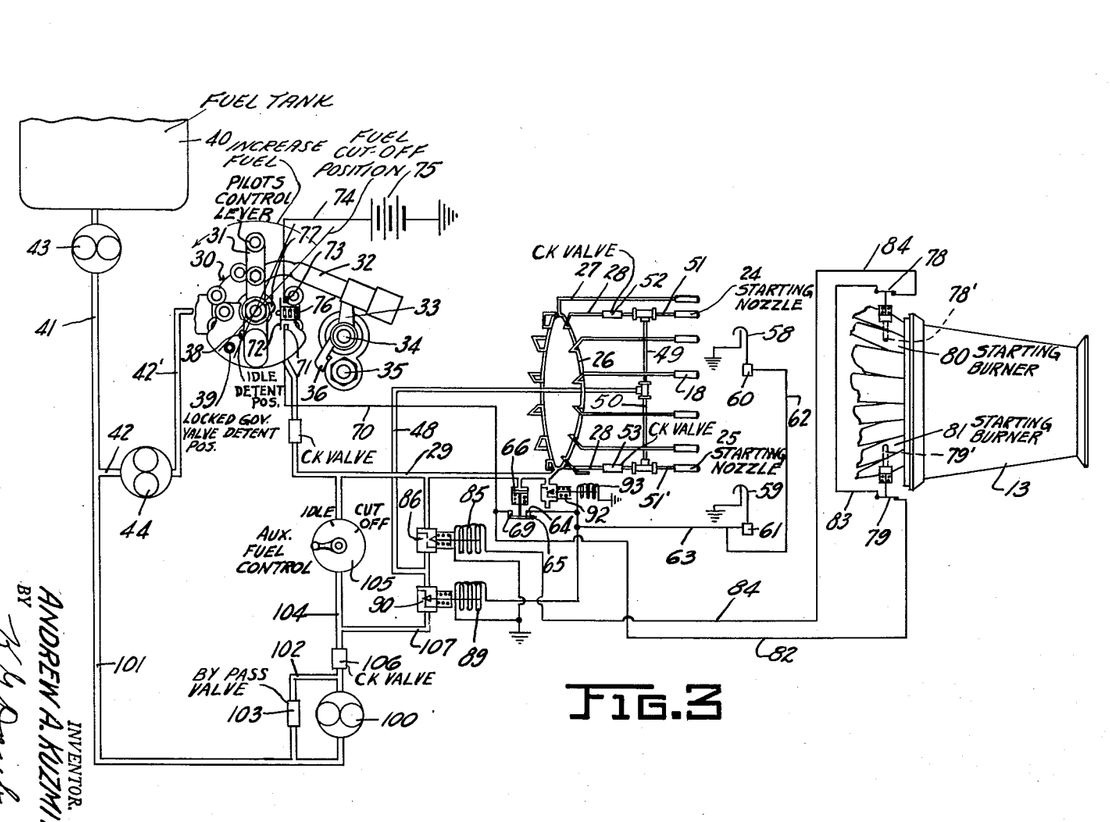
Figure 3, a schematic view of a modified arrangement with respect to the system of Figure 2.

Figure 3

The system illustrated in Figure 3 is the same as that of Figure 2 except that an auxiliary fuel supply pump and coacting circuit has been added for supplying fuel to the engine in the event the main fuel supply system including the control unit 30 should fail. Parts in Figure 3 which correspond to analogous parts in Figure 2 have been given similar reference numerals. The auxiliary system comprises an auxiliary fuel pump 100, which receives fuel from a conduit 101, communicating at its intake with the conduit 42 upstream of pump 44. The pump 100 is provided with a by-pass 102, having a by-pass valve 103 mounted therein. This auxiliary pump delivers into a conduit 104 provided with an auxiliary fuel control unit which may take the form of a valve 105 under manual control of the pilot from the pilot's compartment. A check valve 106 prevents backflow of fuel in the conduit 104. The auxiliary control valve 105 may be by-passed by a conduit 107, which corresponds to the conduit 45 of Figure 2. In the conduit 107 is mounted the solenoid valves 86 and 90 heretofore described in connection with Figure 2, and between which is the inlet to the conduit 48 for conducting starting fuel direct to the starting nozzles 24 and 25.

Operation (Figure 3)

For a normal start, the pilot turns on the boost pump 43 and the auxiliary pump 100, valve 105 remaining closed. He then engages the starter (not shown) and cranks the engine to approximately 1000 R. P. M., moving the main fuel control lever 31 from cut-off to idle position. Since switch 65 is then closed, the ignition circuit will be energized, the solenoid valve 86 closed, valve 90 opened and drip valve 92 closed. Fuel under pressure will then be free to pass to the starting nozzles 24 and 25 without entering the manifold ring 26. When burning is established in the pilot burners 80 and 81 and the temperature attains a predetermined value, say for example 500° F., the thermal switches 78 and 79 open, de-energizing the solenoid 85 so that valve 86 opens, whereupon pressure builds up in the conduit 29, the pressure switch 65 opens, the ignition circuit is deenergized and valve 90 closes. Fuel to all the burner nozzles will then be supplied through the main control unit 30 and the fuel pressure in the pilot burners will drop to a safe value, all the burners will ignite and the engine attain idling speed. It will thus be seen that the auxiliary pump 100 supplies the necessary fuel to start the pilot burners and quickly raise the manifold pressure to, for example, between 45 and 50 p. s. i. after which the engine driven pump 44 automatically supplies the fuel necessary to increase the engine speed to maximum idling, say 4000 R. P. M. If desired, or should a failure of the main fuel control render same necessary, the fuel necessary to maintain the engine in operation may be supplied through the auxiliary pump 100 and auxiliary control unit 105. Under these circumstances, the lever 31 of the main fuel control 30 is used to close the switch 72, or else a separate control for the said switch should be provided.

To restart in flight, either the main fuel control unit or the auxiliary control may be used. In either case, substantially the same procedure may be followed as outlined in connection with Figure 2, except that the emergency pump 100 is used.

In both the main and modified systems of Figures 2 and 3, the same advantages are present. Thus, if for some reason ignition does not take place promptly in the pilot burners, the rate of fuel flow to the fuel manifold ring is limited to a point where it will not flood the engine and create a safety hazard; only two burners are used to start and the fuel pressure build-up for the starting nozzles is rapid, reducing the starting time as well as the amount of excess fuel metered to the engine prior to ignition; after burning in the pilot burners is assured, the manifold pressure is quickly raised to a value where flame propagation takes place; there is little manual attention required to start the engine and bring it up to a self-sustaining idle speed, and the danger of exceeding safe combustion temperatures is minimized; the fuel pressure at the starting nozzles is quickly brought to a value such as to produce a relatively wide cone or spray angle, thereby insuring prompt ignition, a feature of particular importance when making the restarts in flight when the engine may be windmilling and air flow through the burners high.

Figure 4:
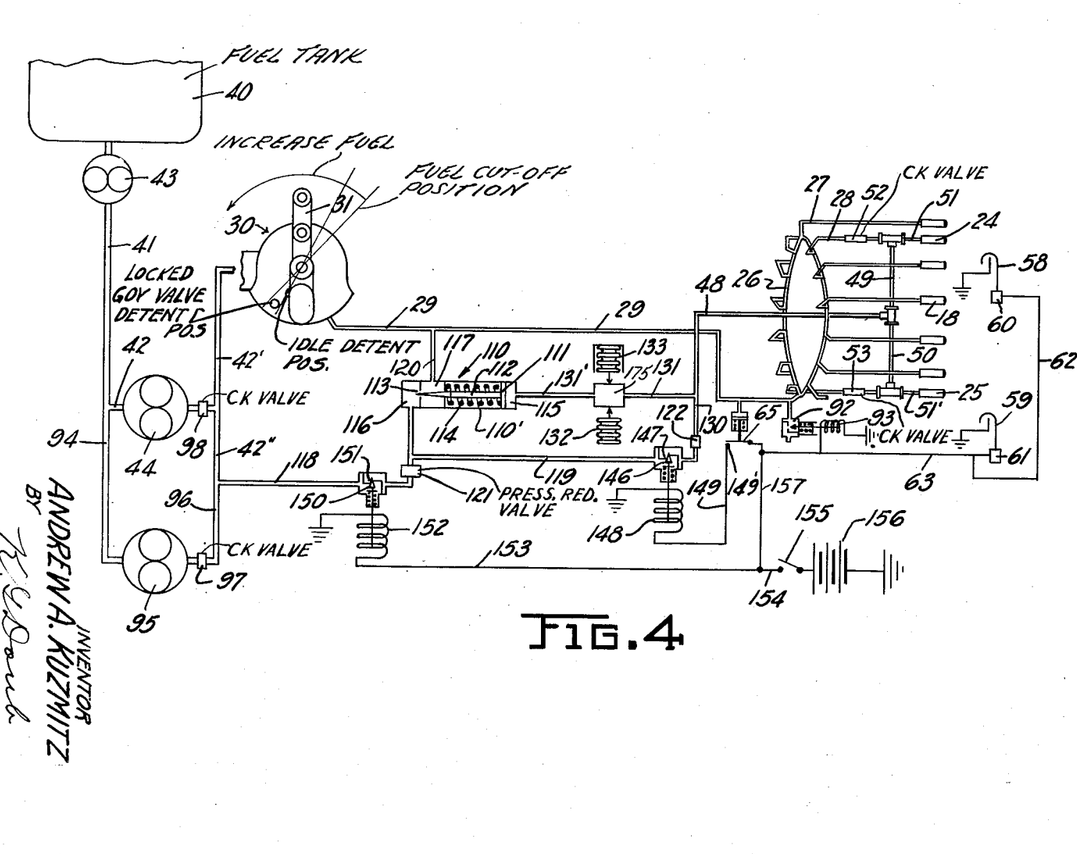
Figure 4, a schematic view of another modification.
Figure 5:
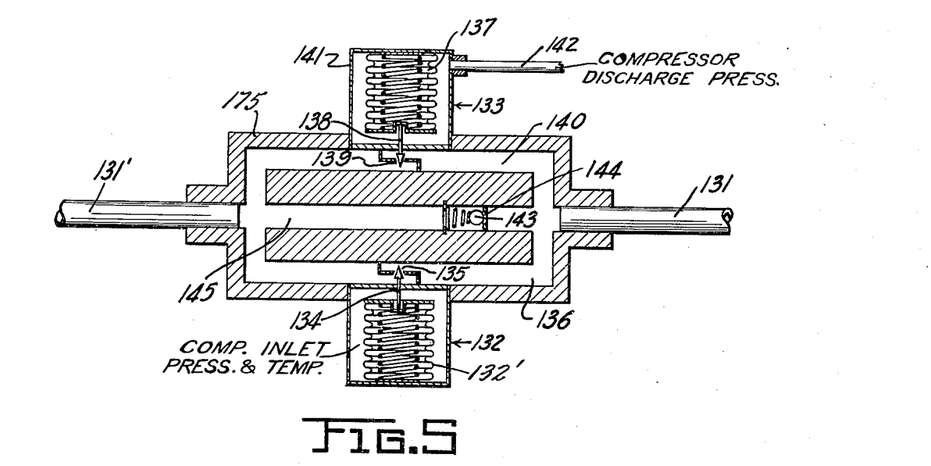
Figures 5 and 6, detail views in section of parts of Figure 4.
Figure 6:
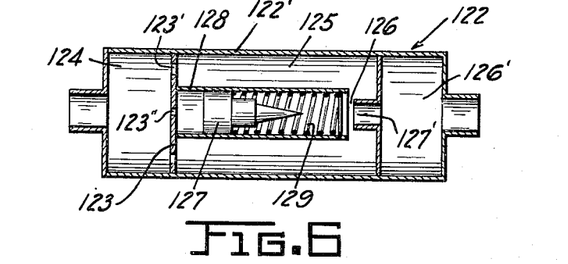

Figures 4, 5 and 6

The starting system of Figures 4, 5 and 6 includes among its advantages: metering of fuel to the burner system in relation to changes in altitude or air density and/or as a function of compressor pressure and hence turbine speed, and as a consequence, elimination, if desired, of thermal switches.

Referring to Figure 4, parts which correspond to similar parts in Figures 2 and 3 are given similar reference numerals and need not again be described.

A metering valve of the dashpot type is generally indicated at 110; it includes a cylinder 110′ having a piston 111 slidably mounted therein and carrying a metering pin or valve 112, adapted to control the area of a metering orifice 113. A spring 114 normally urges the pin or valve 112 to its retracted position, inward movement (valve closing movement) resulting from admission of fuel under pressure into chamber 115 in a manner to be described. The fuel to be metered enters a chamber 116, then flows through orifice 113 and into outlet chamber 117.

A main starting by-pass conduit 118 has its inlet end connected to the fuel conduit 42″; it conducts fuel to the chamber 116 and also to a branch conduit 119. From chamber 116 the fuel is metered into the chamber 117 and thence through conduit 120 to the main fuel conduit 29 and the manifold 26. Preferably, but not necessarily, a pressure reducing valve, shown diagrammatically at 121, is provided to maintain a predetermined pressure in the starting fuel flowing to the starting system.

The conduits 118 and 119 also conduct fuel to the starting nozzles 24 and 25 through a quantity measuring and limiting valve which is known in the art as a hydraulic fuse valve, generally indicated at 122, the said valve being designed to admit a certain predetermined quantity of fuel to the starting nozzles, and thereafter automatically close off flow of fuel to said nozzles. An example of such a valve is illustrated in Figure 6; in the simplified form shown it comprises a cylindrical shell 122′, spanned by a wall 123, formed with outer flow orifices or ports 123′ and a central bleed or orifice 123″. Fuel or fluid under pressure flows into a chamber 124 and the main bulk thereof flows through the calibrated ports or orifices 123′ into a central chamber 125 and thence out through restricted space or port 126 and chamber 126′. A certain portion of the fuel also flows through the restricted orifice or bleed 123″ and acts on a piston valve 127, mounted to slide in a cylinder 128 against the resistance of a light return spring 129 and adapted to seat at 127′ and close port 126 when it reaches its seated position. The closing travel of the piston is determined by the drop thereacross, which in turn is a function of or is in proportion to the flow. After a predetermined or measured quantity of fuel has passed through the ports 123″ and restriction 126, the valve 127 seats and fuel flow is cut off downstream of the valve.

Fuel passed by the fuse valve 122 flows by way of conduits 130, 131 and parallel passages 145, 136 and 140 located in a housing 175, see Figure 5, to a conduit 131′ and then to the chamber 115 of the metering valve 110. Referring to Figure 5, check valve 143 in passage 145 prevents backflow of fuel through said passage when piston 111 of metering valve 110 moves back or to the right through force of spring 114, the rate of movement of said piston being varied as a function of pressure and temperature of the air flowing to the compressor and also as a function of compressor discharge pressure by a bellows or aneroid assembly 132 and/or a pressure responsive bellows or aneroid assembly 133; note Figure 5 in connection with Figure 4. The aneroid assembly 132 comprises a spring loaded pressure and temperature-responsive bellows 132′ which carries a valve 134, adapted to vary the area of an orifice or port 135 formed in the passage 136, and said bellows may be and preferably is located at a point where it will be subject to ram pressure and temperature.

The aneroid assembly 133 may comprise an evacuated pressure-responsive spring loaded bellows 137, which carries a valve 138, adapted to vary the area of an orifice or port 139, formed in passage 140, the said bellows 137 being mounted in and anchored at one end to a housing 141, to which compressor discharge pressure may be transmitted by way of a tube or conduit 142.

Between the outer parallel passages 136 and 140 is the one-way flow passage 145 provided with the check valve 143 which controls a port 144, the said check valve permitting flow through said passage 145 only in a direction toward the chamber 115 of the metering valve 110. It will be obvious that when the piston 111 closes or moves back to the right, fuel may escape from piston chamber 115 only by way of either or both the outer passages 136 and/or 140, the rate of escape of fuel from the chamber 115, and hence the rate of retraction of the piston 111 being determined by the respective areas of the ports 135 and 139.

The electrical system in Figure 4 includes the spark plugs 58 and 59 of Figures 2 and 3 and an electrical circuit therefor; it also includes a normally closed solenoid valve 146, adapted to control a port 147 and provided with a coil 148, connected by wire 149, with a terminal 149′ adapted to be contacted by pressure switch 65 when the pressure in the fuel line 29 reaches a given value, for example, 30 p. s. i. Another solenoid valve 150 controls a port 151 in the conduit 118 upstream of the valve 110 and branch conduit 119, said valve 150 being provided with a coil 152, connected by a wire 153 with the main line wire 154. A switch 155, preferably manually operable from the pilot's compartment, controls energization of the electrical starting circuit, which may be supplied by current from a suitable source of potential, such as a battery 156. Another wire 157 connects the main line wire 154 with the wire 63 of the ignition circuit.

*Operation (Figures 4, 5 and 6)*

The pilot first turns on the boost pump 43 with the control lever 31 in cut-off position, then depresses the starter button (not shown), and when the engine attains a speed of approximately 1000 R. P. M., he turns on the ignition system by closing the switch 155, which in this instance is shown independent of the fuel control unit 30.

The drip valve 92 then closes and the solenoid coil 152 of the normally closed solenoid valve 150 becomes energized and opens, allowing fuel to flow to the manifold 26 through the pressure reducing valve 121 and the metering valve 110.

When the pressure in the manifold 26 and hence in the conduit 29 attains a value of say 30 p. s. i., the switch 65 closes, energizing the coil 148 of the normally closed solenoid valve 146, whereupon this valve opens and fuel under pressure flows into the chamber 124 of the fuse valve 122 and a predetermined or measured quantity of fuel passes to the starting nozzles and also to chamber 115 of the dashpot through check valve 143 (see Figure 5), forcing piston 111 to the left, feeding of fuel to these nozzles being continued until the valve 127 seats and closes the port 126 (Figure 6). Ignition at the starting nozzles ensues upon discharge of fuel therefrom and the pressure in the starting burners immediately rises. The fuel pressure communicated to the chamber 115 of the metering valve 110 causes the valve 112 to move to the left and restrict orifice 113 such that sufficient fuel will pass to the fuel manifold 26 by way of conduits 120 and 29 to maintain a pressure therein which will hold switch 65 closed and produce sufficient discharge of fuel from the burner nozzles 18 as will permit ignition and flame propagation when flame is communicated thereto from the starting burners. The quantity of fuel passed to the starting burners by way of the fuse valve 122 should be such as to insure ignition and burning in the starting burners before the fuse valve closes. When the valve 127 of Figure 6 closes, the pressure at the starting nozzles drops to the approximate pressure existing in the manifold 26; and when this happens, the pressure in the line 131 drops and the pressure is relieved in the chamber 115 of the metering valve 110, permitting the piston 111 to move to the right, whereupon valve 112 meters fuel to the manifold 26 through the orifice or port 113, the rate at which this fuel is metered varying as a function of entering air temperature and pressure and also as a function of compressor pressure or turbine speed. Fuel pressure now builds up in the manifold 26 and the turbine is brought up to idle speed at a safe combustion temperature. When the engine attains a suitable idle speed, the pilot moves the control lever 31 of the unit 30 to idle position and opens the switch 155, whereupon the engine or turbine may be controlled through the main fuel control unit 30.

It will be seen that the rate of fuel feed to the burner system during the starting period may be controlled so that it will be greater at ground level than at altitude, this being desirable due to the fact that less fuel is required at altitude in view of the reduced density or supply of air; and it will also be obvious that the rate of feed of the starting fuel may be varied in relation to compressor output, and since this varies in relation to turbine speed, the feed of starting fuel also becomes a function of engine speed.

To restart in flight, it is only necessary to close off fuel flow to the manifold by way of the control device 30, and when the manifold pressure drops to, for example, 15 p. s. i. or less, turn on the ignition switch 155.

Figure 7:
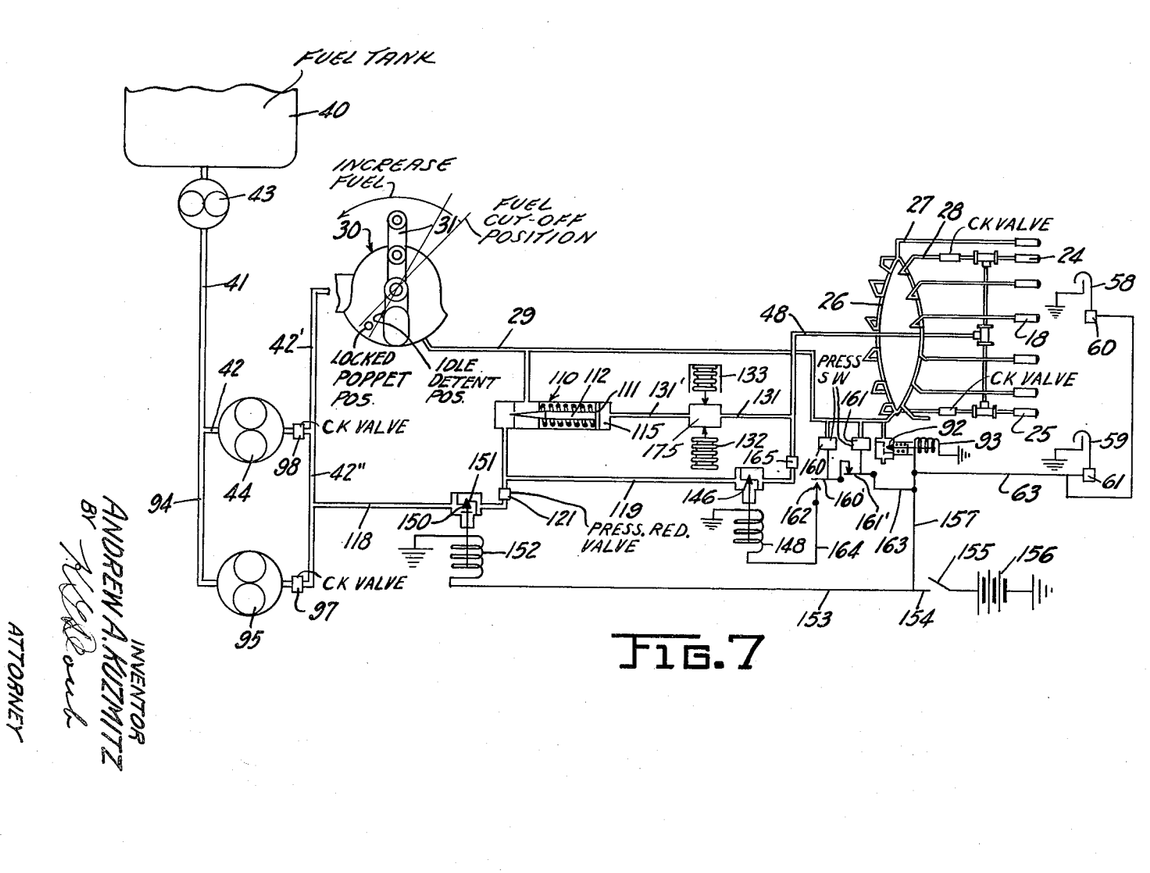
Figure 7, a schematic view of a further modified arrangement.

Figure 7

The arrangement shown in Figure 7 is essentially a slight modification of Figure 4, and parts which have been previously described and shown in connection with Figure 4 and preceding figures have been given similar reference numerals. Instead of the single pressure switch of Figure 4, a pair of manifold pressure switches 160 and 161 are provided and these switches carry switch elements or movable contacts 160' and 161' arranged in series. The switch 160 is adapted to close against spring resistance at, for example, a manifold pressure of 15 p. s. i., while the switch 161 may be adapted to open at a manifold pressure of approximately forty pounds. When switch 160 closes with 161 closed and contact 160' engages terminal or contact 162, current flows from line wire 157 through wire 163, switch elements 161', 160' and wire 164 to the coil 148 of solenoid valve 146. An orifice or bleed 165 is inserted in line 48 to limit the maximum pressure on the starting nozzles. The remaining structure of Figure 7 is sufficiently disclosed in Figure 4 to enable those skilled in the art to readily understand the same in view of the following description of operation.

Operation (Figure 7)

The pilot turns on the boost pump and, if desired, the emergency or auxiliary pump 95, with the lever 31 of the control unit 30 in cut-off position. The starting motor (not shown) is then engaged and the engine cranked. At about 1000 R. P. M. the ignition switch 155 is closed, placing the starting system in operation. Sparking at the plugs 58 and 59 then ensues, the drip valve 92 closes and solenoid valve 150 opens and allows fuel to flow across metering valve 110 to fuel line 29 and hence to the manifold 26, the reducing valve 121 limiting the pressure in the starting line upstream of the metering valve 110 to a predetermined value. When the manifold pressure reaches say 15 p. s. i., pressure switch 160 closes and solenoid valve 146 opens, allowing fuel to flow to the starting nozzles 24 and 25 through orifice or bleed 165 and fuel line 48. The quantity of fuel passed by the orifice 165 may bring the pressure at the starting nozzles up to say 90 p. s. i. while ignition is taking place and combustion increases in the starting burners; and in the meantime, fuel has passed through fuel lines 131, 131' to chamber 115 of metering valve 110 and has moved needle 112 to the left to restrict orifice 113 such that sufficient fuel will pass to the fuel manifold 26 to maintain a pressure therein which will hold pressure switch 160 closed and produce sufficient discharge of fuel from the burner nozzles 18 as will permit ignition and flame propagation when flame is communicated thereto from the starting burners. When the pressure in the manifold reaches say 40 p. s. i., the pressure switch 161 opens, thereby breaking the circuit to the solenoid valve 148, causing the pressure in fuel lines 48 and 131 to drop, whereupon needle 112 starts to retract, metering fuel to the manifold 26 as a function of engine speed and/or entering air density (see Figure 5). When the engine has attained the desired idle speed, or after it has attained a speed such that it can be controlled by the main control unit 30, switch 155 is opened, thereby closing solenoid valve 150 and shutting off the starting system. If desired, the switch 155 may be interconnected with the control unit 30 for automatic operation as in Figures 2 and 3.

To restart in flight, the lever 31 of the control unit 30 may be turned to cut-off position, and when the manifold pressure drops to 15 p. s. i., the ignition is turned on. The operation is then substantially the same as above described.

It will be understood that no attempt has been made herein to enumerate all of the advantages of the improved starting system or to state the various alternative methods of operation. The drawings and descriptive matter should therefore not be considered as limiting the invention, the scope of the latter being defined by the appended claims.

I claim:
1. In a fuel supply and starting system for gas turbine engines, a plurality of fuel nozzles arranged to discharge fuel under pressure for admixture with air for effecting combustion, at least one of said nozzles functioning as a starting nozzle, ignition means for said starting nozzle, a fuel manifold common to all of said nozzles including the starting nozzle, a main fuel conduit for conducting fuel to said manifold, a manually operable fuel control device for regulating flow of fuel through said main fuel conduit, a by-pass conduit for supplying fuel to said starting nozzle only and arranged to by-pass said manifold, valve means controlling flow of fuel through said by-pass conduit, and fuel pressure responsive means controlling said valve means whereby fuel flow through said by-pass conduit is stopped when the fuel presure in said main fuel conduit attains a predetermined value.

2. In a fuel supply and starting system for a gas turbine engine having a combustion chamber, a plurality of fuel nozzles arranged to discharge fuel under pressure for admixture with air for effecting combustion, at least one of said nozzles functioning as a starting nozzle, an ignition circuit including a sparking device for igniting the fuel discharged from said starting nozzle, a fuel manifold common to all of said nozzles including the starting nozzle, a fuel control device for regulating flow of fuel to said manifold, a starting fuel conduit for conducting fuel to said starting nozzle and arranged to by-pass said manifold, a solenoid valve controlling flow of fuel through said starting fuel conduit and provided with a solenoid interposed in the ignition circuit, a pressure switch operable to make and break said circuit in response to changes in pressure of the fuel in said manifold, and means responsive to a rise in combustion chamber temperature for communicating said starting fuel conduit with said manifold for operating said pressure switch.

3. In a fuel supply and starting system for a gas turbine engine having a plurality of combustion chambers at least one of which functions as a starting chamber, a plurality of fuel nozzles arranged to discharge fuel under pressure into said combustion chambers at least one of which functions to spray fuel into said starting chamber, an ignition circuit including a spark plug for igniting the fuel discharged from said starting nozzle, a fuel manifold common to all of said nozzles including the starting nozzle, a pressure switch responsive to the pressure of fuel supplied to said manifold controlling said ignition circuit and arranged in a manner such that the ignition circuit becomes energized only when the fuel pressure is below a predetermined value, a starting fuel circuit including a starting fuel conduit arranged to by-pass said manifold, a first solenoid valve controlling flow of fuel through said starting fuel conduit and having a solenoid interposed in the ignition circuit, a second solenoid valve in said starting fuel conduit for controlling the initial application of pressure to said pressure switch, and a thermal switch controlling energization of said second solenoid valve having a thermal element responsive to changes in temperature in the region of said starting chamber.

4. In a fuel supply and starting system for a gas turbine engine having a combustion chamber, a plurality of fuel nozzles arranged to discharge fuel under pressure for admixture with air for effecting combustion, at least one of said nozzles functioning as a starting nozzle, an ignition circuit including a spark plug for igniting starting fuel from said starting nozzle, a fuel manifold common to all of said nozzles including the starting nozzle, a main fuel conduit for supplying fuel to said manifold, a manually operable fuel control device for controlling flow of fuel through said conduit, a pump for pressuring fuel to said control device, a starting fuel conduit for supplying starting fuel to said starting nozzle, said latter conduit receiving fuel pressured by said pump upstream of said control device and by-passing said manifold downstream of said device, a valve for controlling flow of fuel through said starting fuel conduit, a metering valve for metering fuel to said manifold during the starting period, and means urging said metering valve towards open position.

5. In a fuel supply and starting system for a gas turbine engine having a combustion zone, a plurality of fuel nozzles arranged to discharge fuel under pressure into said zone for admixture with air for effecting combustion, at least one of said nozzles functioning as a starting nozzle, ignition means for igniting the fuel discharged from said starting nozzle, a fuel manifold common to all of said nozzles including the starting nozzle, means for conducting starting fuel under pressure to the starting nozzle or nozzles independently of manifold pressure during the starting period, and means for metering fuel at a predetermined rate to the fuel manifold during the starting period to gradually build up a predetermined controlled pressure in the manifold as the engine attains idle speed.

6. A fuel supply and starting system as claimed in claim 5 wherein said metering means includes a device responsive to changes in density of the air flowing to the engine for varying the manifold pressure build-up in relation to changes in altitude.

7. A fuel supply and starting system as claimed in claim 5 wherein means is provided for controlling the rate of metering as a function of engine speed.

8. In a fuel supply and starting system for a gas turbine engine having a combustion zone, a plurality of fuel nozzles arranged to discharge fuel under pressure into said zone for admixture with air for effecting combustion, at least one of said nozzles functioning as a starting nozzle, ignition means for igniting the fuel discharged from said starting nozzle, a fuel manifold common to all of said nozzles including the starting nozzle, a fuel control device for regulating flow of fuel to said manifold, a starting fuel conduit by-passing said device and manifold for conducting starting fuel to said starting nozzle independently of manifold pressure during the starting period, and a metering device for metering by-passed fuel to the manifold independently of said main fuel control device during the starting period.

9. A fuel supply and starting system as claimed in claim 8 wherein the rate of metering of said metering device is variable in relation to changes in the density of the air flowing to the engine.

10. A fuel supply and starting system as claimed in claim 8 wherein the rate of metering of said metering device is variable as a function of engine speed.

11. In a fuel supply and starting system for a gas turbine engine having a combustion zone, a plurality of fuel nozzles arranged to discharge fuel under pressure into said zone for admixture with air for effecting combustion, at least one of said nozzles functioning as a starting nozzle, ignition means for igniting the fuel discharged from said starting nozzle, a fuel manifold common to all of said nozzles including the starting nozzle, a fuel control device for regulating flow of fuel to said manifold, a starting fuel conduit by-passing said device and manifold for conducting fuel to said starting nozzles, and means in said by-pass conduit for automatically measuring the quantity of starting fuel admitted to said starting nozzles.

12. A fuel supply and starting system as claimed in claim 11 wherein said automatic measuring means comprises a hydraulic valve which meters starting fuel to the starting nozzle and then automatically shuts off.

13. In a fuel supply and starting system for a gas turbine engine having a plurality of combustion chambers, at least one of which functions as a starting chamber, a plurality of fuel nozzles arranged to discharge fuel under pressure into said chambers for admixture with air for effecting combustion, at least one of said nozzles functioning as a starting nozzle, ignition means for igniting the fuel discharged from said starting nozzle, a fuel manifold common to all of said nozzles including the starting nozzle, a fuel control device for regulating flow of fuel to said manifold during normal engine operation, a starting fuel conduit by-passing said device and manifold for conducting fuel to said starting nozzles independently of said manifold, a hydraulic fuse valve in said by-pass conduit functioning to admit a predetermined quantity of starting fuel to said starting nozzle and thereafter close off the flow of starting fuel to said latter nozzle, and means for metering fuel to the manifold during the starting period.

14. A fuel supply and starting system as claimed in claim 13 wherein said metering means includes a dashpot type metering valve and means responsive to changes in the density of the air flowing to the engine is provided for adjusting the rate of movement of said valve.

15. In a fuel supply and starting system for a gas turbine engine having a combustion zone into which air is pressured by a compressor, a plurality of fuel nozzles arranged to discharge fuel under pressure into said zone for admixture with air for effecting combustion, at least one of said nozzles functioning as a starting nozzle, ignition means for igniting the fuel discharged from said starting nozzle, a fuel manifold common to all of said nozzles including the starting nozzle, a main fuel control device for regulating flow of fuel to said manifold during normal engine speeds, a starting fuel conduit by-passing said device and manifold for conducting fuel to said starting nozzle, a device such as a hydraulic fuse valve interposed in said by-pass conduit functioning to measure the quantity of fuel fed to said starting nozzle and thereafter shut off flow of fuel to said nozzle, a metering valve arranged to meter, at any given engine operating condition, a predetermined quantity of the fuel flowing through said starting fuel conduit to the manifold during the starting period, a piston connected to said metering valve, means for communicating fuel under pressure to said piston to actuate the latter, and means responsive to changes in a parameter affecting engine operation for adjusting the rate of travel of said piston.

16. In a fuel supply and starting system for a gas turbine engine having a combustion zone, a plurality of fuel nozzles arranged to discharge fuel under pressure into said zone for admixture with air for effecting combustion, at least one of said nozzles functioning as a starting nozzle, an electrical ignition circuit including an ignition device for igniting the fuel discharged from said starting nozzle, a fuel manifold common to all of said nozzles including the starting nozzle, a main fuel control device for regulating flow of fuel to said manifold during normal engine operation, starting fuel conduit means which by-passes said manifold for conducting fuel to said starting nozzle independently of the said manifold and which by-passes said device for conducting fuel to said manifold, a device interposed in said by-pass conduit functioning to regulate the quantity of fuel passed to said starting nozzle, and a metering valve arranged to meter the fuel flowing through said starting fuel conduit to the manifold during the starting period.

17. In a fuel supply and starting system for a gas turbine engine having a combustion zone, a plurality of fuel nozzles arranged to discharge fuel under pressure into said zone for admixture with air for effecting combustion, at least one of said nozzles functioning as a starting nozzle, means for igniting the fuel discharged from said starting nozzle, a fuel manifold common to all of said nozzles including the starting nozzle, a fuel control device for regulating the flow of fuel to said manifold, means for pressurizing fuel to and through said device and manifold, a starting fuel conduit by-passing said device and manifold for conducting fuel under pressure to said starting nozzle, and means operable as a function of manifold pressure for admitting starting fuel to said starting nozzle when the pressure in the manifold is at a predetermined low value and for closing off starting fuel to the starting nozzle at a predetermined higher manifold pressure.

18. In a fuel supply and starting system for a gas turbine engine having a combustion chamber, a plurality of fuel nozzles arranged to discharge fuel under pressure for admixture with air for effecting combustion, at least one of said nozzles functioning as a starting nozzle, means for igniting the fuel discharged from said starting nozzle, a fuel manifold common to all of said nozzles including the starting nozzle, a fuel control device for regulating the flow of fuel to said manifold during normal engine operation, means for pressurizing fuel to and through said device and manifold, a starting fuel conduit by-passing said device and manifold for conducting fuel under pressure to said starting nozzles, a flow control device in said by-pass conduit upstream of said nozzles, and means responsive to manifold pressure for automatically admitting fuel to said starting nozzle by way of said starting fuel conduit and flow control device when the pressure in the manifold is at a predetermined low value and for closing off such fuel to the starting nozzle at a predetermined higher manifold pressure.

19. In a fuel supply and starting system for a gas turbine engine having a combustion zone, a plurality of fuel nozzles arranged to discharge fuel under pressure into said zone for admixture with air for effecting combustion, at least one of said nozzles functioning as a starting nozzle, ignition means for igniting the fuel discharged from said starting nozzle, a fuel manifold common to all nozzles including the starting nozzle, a fuel control device for regulating flow of fuel under pressure to said manifold, a conduit for starting fuel by-passing said device and manifold and terminating at the starting nozzle, a fuel inlet valve for admitting fuel to said starting fuel conduit, a metering valve of the dashpot type arranged to pass a certain quantity of fuel to the manifold when starting fuel is first admitted to said starting fuel conduit, said metering valve being responsive to starting fuel pressure and being spring-urged to return position against such pressure and during such return movement functioning to meter fuel to the manifold to gradually increase the pressure therein so that the engine will gradually accelerate to a self-sustaining speed without overtemperature, and another valve responsive to fuel pressure for automatically cutting off flow of starting fuel to the starting nozzles subsequent to ignition of the starting fuel.

20. A fuel supply and starting system as claimed in claim 13 wherein said metering means includes a dashpot type metering valve and means operative as a function of engine speed is provided for adjusting the rate of movement of said valve.

21. In a fuel supply and starting system for a gas turbine engine having a combustion zone, a plurality of fuel nozzles arranged to discharge fuel under pressure for admixture with air for effecting combustion, at least one of said nozzles functioning as a starting nozzle, ignition means for igniting the fuel discharged from the starting nozzle, a fuel manifold common to all of said nozzles including the starting nozzle, a main fuel control device for regulating flow of fuel to said manifold and nozzles when the engine attains a self-sustaining speed, a starting fuel conduit arranged to conduct starting fuel to said starting nozzle, said conduit by-passing said manifold, means for supplying a regulated quantity of starting fuel to the starting nozzle through said conduit, and means controlled as a function of starting fuel pressure for metering fuel to the fuel manifold during the starting period.

22. In a fuel supply and starting system for a gas turbine engine having a combustion zone, a plurality of fuel nozzles arranged to discharge fuel under pressure for admixture with air for effecting combustion, at least one of said nozzles functioning as a starting nozzle, ignition means for igniting the fuel discharged from the starting nozzle, a fuel manifold common to all of said nozzles including the starting nozzle, a main fuel control device for regulating flow of fuel to said manifold and nozzles when the engine attains a self-sustaining speed, a starting fuel conduit arranged to conduct starting fuel to said starting nozzle, said conduit by-passing said manifold, means defining a metering orifice through which fuel is metered to said manifold during the starting period, a movable valve for varying the area of said orifice as a function of starting fuel pressure, and means for automatically effecting a predetermined rate of travel of said valve.

23. A fuel supply and starting system for a gas turbine engine as claimed in claim 22, wherein said valve is connected to a dash-pot piston exposed to starting fuel and a calibrated spring is provided for moving said piston.

24. A fuel supply and starting system for a gas turbine engine as claimed in claim 22 wherein said valve is connected to a spring-pressed dash-pot piston which is moved in a direction to initially restrict said orifice in response to the build up of pressure of fuel at the starting nozzle and in the opposite direction by spring force, and a fuel pressure-responsive valve is provided for cutting off flow of starting fuel to the starting nozzle.

25. In a fuel supply and starting system for a gas turbine engine having a combustion chamber, a plurality of fuel nozzles arranged to discharge fuel under pressure for admixture with air for effecting combustion, at least one of said nozzles functioning as a starting nozzle, an ignition circuit including a sparking device for igniting the fuel discharged from said starting nozzle, a fuel manifold common to all of said nozzles including the starting nozzle, a fuel control device for regulating flow of fuel to said manifold, a starting fuel conduit for conducting fuel to said starting nozzle and arranged to by-pass said manifold, valve means controlling flow of fuel through said starting fuel conduit, means for effective closure of said valve means and breaking of the ignition circuit, and means adapted to respond to a predetermined combustion chamber temperature for effecting operation of said valve closing and circuit breaking means.

ANDREW A. KUZMITZ.

References Cited in the file of this patent
UNITED STATES PATENTS

| Number | Name | Date |
|---|---|---|
| 980,801 | Kraus | Jan. 3, 1911 |
| 1,820,612 | Good et al. | Aug. 25, 1931 |
| 2,056,198 | Lasley | Oct. 6, 1936 |
| 2,096,184 | Lasley | Oct. 19, 1937 |
| 2,112,672 | Lasley | Mar. 29, 1938 |
| 2,199,454 | Andler et al. | May 7, 1940 |